United States Patent Office 3,406,207
Patented Oct. 15, 1968

3,406,207
DIPHENOXYBIPHENYL COMPOUNDS
AND PROCESS
Robert M. Schisla, Kirkwood, and William C. Hammann, Creve Coeur, Mo., assignors to Monsanto Company, a corporation of Delaware
No Drawing. Filed Sept. 20, 1963, Ser. No. 310,457
6 Claims. (Cl. 260—613)

This invention is directed to the class of diphenoxybiphenyl compositions, wherein at least one of the phenoxy groups is in the meta position on the biphenyl nucleus. This invention embraces the specific compounds 3,2'-diphenoxybiphenyl, 3,3'-diphenoxybiphenyl, 3,4'-diphenoxybiphenyl, and 3,4-diphenoxybiphenyl, mixtures of the aforesaid compounds, and mixtures of the aforesaid class of compounds wherein said compounds are preferably present in a quantity of at least 50 weight percent of the total composition. The instant invention is also directed to the process of producing the aforesaid compounds and mixtures.

The present critical requirements for high-temperature functional fluids are extremely restrictive. Thus, the functional fluid may be required as synthetic lubricants for jet engines, as hydraulic fluids and lubricants for supersonic aircraft and missiles, as coolants for electronic equipment, as coolant-moderators for nuclear reactors, as heat-transfer agents, etc., wherein the fluid is often required to function at extreme temperature ranges up to 800° F. and higher and down to normal atmospheric temperatures. These requirements pose the very difficult problem of finding suitable compositions which are thermally stable at the very high temperatures, but are still fluid at the lower temperatures. The fluids should also possess the characteristics of being oxidation resistant and resistant to degradation in the presence of radiant energy. The fluids must also possess adequate temperature-viscosity properties and suitable lubricity, i.e., the fluids must not get too thin at the very high temperatures and/or too thick at the lower temperatures, thereby requiring a wide fluid range, and must possess adequate lubricating characteristics over the range of temperatures to which a particular system is subjected. The fluids should possess relatively low vapor pressure to preclude their volatilization at the elevated operating temperatures.

The polyphenyl ethers have been found to be eminently suitable materials for high-temperature use as functional fluids as set out in the copending applications by E. S. Blake and W. C. Hammann, Ser. No. 766,685, filed Oct. 13, 1958, and Ser. No. 101,081, filed Apr. 6, 1961 and now abandoned, but such compositions have remained relatively expensive.

The principal object of the instant invention is to prepare functional fluid compositions which have high thermal stability at temperatures of the order of about 700° to 800° F. and higher. Another object of the instant invention is to provide functional fluid compositions which can be maintained in a fluid state at from about normal atmospheric temperature to very high temperatures of the order of about 800° F. and higher. Still another object of the instant invention is to provide functional fluid compositions which possess good temperature-viscosity and lubricity characteristics, have a high oxidation resistance, high radiation stability, low vapor pressure, and are substantially free from corrosive action. A further object of the instant invention is to provide an economical process for the production of functional fluid compositions having a plurality of the chemical and physical properties set out hereinabove. Other objects and advantages of this invention will be apparent to those skilled in the art from the following disclosure.

It has now been found that specific members of the diphenoxybiphenyls, i.e. compositions having the structural formula

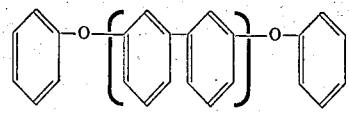

wherein at least one of the phenoxy substituents is in the meta configuration with respect to the biphenyl nucleus, are particularly useful as thermally stable functional fluids. Of the twelve possible diphenoxybiphenyls, only four isomers have suitable physical properties to provide the desired wide temperature fluid range necessary for use as suitable functional fluid compositions. The suitable isomers of diphenoxybiphenyl having fluid properties at room temperature are 2,3'-diphenoxybiphenyl, 3,3'-diphenoxybiphenyl, 3,4'-diphenoxybiphenyl, and 3,4-diphenoxybiphenyl and this restricted class of diphenoxybiphenyls will be referred to as the "fluid diphenoxybiphenyls." All of the other possible isomers of diphenoxybiphenyl are crystalline solids at room temperature having melting points ranging from about 153° to 311° F., i.e. the crystalline solid diphenoxybiphenyls have a melting point of the order of at least about 100° F. above that of the specific class of fluid diphenoxybiphenyls. The melting points of the diphenoxybiphenyls which are not fluids at normal room temperatures are given below:

| Isomer: | Melting point, ° F. |
|---|---|
| 4,4'-diphenoxybiphenyl | 311 |
| 2,2'-diphenoxybiphenyl | 213 |
| 2,4'-diphenoxybiphenyl | 153 |
| 2,3-diphenoxybiphenyl | 197 |
| 2,4-diphenoxybiphenyl | 172 |
| 2,5-diphenoxybiphenyl | 202 |
| 2,6-diphenoxybiphenyl | 179 |
| 3,5-diphenoxybiphenyl | 198 |

Whereas the aforesaid class of fluid diphenoxybiphenyls per se are particularly useful as thermally stable functional fluids, it will be understood that mixtures of the aforesaid isomeric compounds can also be employed, including mixtures of such fluid diphenoxybiphenyls with other isomeric diphenoxybiphenyl compounds. Such mixtures preferably should contain at least 50 weight percent of the fluid diphenoxybiphenyls. Additionally the fluid diphenoxybiphenyls can be formulated with other related poly(phenylene-ether) compounds, wherein the said diphenoxybiphenyls comprise at least 50, preferably up to about 65, and more preferably still up to about 80 weight percent of such composition. To assure good fluid properties of mixed compositions the poly(phenylene-ether) compounds preferably should have at least about 50 percent of their linkages in the meta configuration. Preferably the instant functional fluid compositions are substantially free from any substituents to the individual compounds comprising the particular mixture, i.e. the individual compounds are made up from a combination solely of phenyl, phenylene, and oxa ether linkages, each compound contains at least one ether linkage, at least one phenylene radical, and at least two phenyl radicals, not more than two benzenoid rings are directly linked together, e.g. the biphenylyl or biphenylene radical, and contain a total of from about 3 to about 10 and preferably from about 4 to about 7 benzenoid rings in each individual compound of the aforesaid class of mixtures. Whereas the unsubstituted compounds are preferred, low molecular weight tertiary-alkyl radicals, such as the tertiary-butyl radical, or α-cumyl radicals can be substituted on the individual compounds but preferably not more than two such radicals should be substituted on any individual compound and preferably such substituents are on the terminal radicals of the said compounds and substituted in the meta position.

Illustrative poly(phenylene-ether) compounds are the dibiphenylyl ethers such as di(m-phenylphenyl) ether; biphenylyl phenoxyphenyl ethers, such as m-phenylphenyl m-phenoxyphenyl ether, and isomers and analogs thereof, such as m-bis(m-phenylphenoxy)benzene, etc.; and the polyphenyl ethers such as bis(m-phenoxyphenyl) ether, m-bis(m-phenoxyphenoxy)benzene, bis[m-(m-phenoxyphenoxy)phenyl] ether, m-bis[m-(m-phenoxyphenoxy)phenoxy]benzene, m-(m-phenoxyphenoxy)phenyl p-phenoxyphenyl ether, p-bis(m-phenoxyphenoxy)benzene, bis[p-(m-phenoxyphenoxy)phenyl] ether, m-bis[m-(p-phenoxyphenoxy)phenoxy] benzene, m-bis[m-(m-tert-butylphenoxy)phenoxy] benzene, bis[m-(m-α-cumyl-phenoxy)phenyl] ether, and the like.

The preparation of the polyphenyl ethers is fully set out in the copending applications by E. S. Blake and W. C. Hammann, Ser. Nos. 702,767, 766,685, and 101,081, respectively, filed Dec. 16, 1957 and now abandoned, Oct. 13, 1958, and Apr. 6, 1961, which applications are incorporated herein by reference for the purpose of exemplifying the polyphenyl ether compounds per se and as mixed compositions to be formulated in minor amounts with the diphenoxybiphenyl compositions of this invention.

The aforesaid fluid diphenoxybiphenyls and mixtures thereof together with poly(phenylene-ether) compounds, as set out hereinabove, have been found to be exceptionally good functional fluid compositions having the combination of thermal stability, oxidation stability, hydrolytic stability, radiation stability, pour points below normal atmospheric temperature, low vapor pressure at elevated temperatures, a wide fluid range, good viscosity properties, good lubricity, an extended useful life at elevated temperatures, and are substantially free from corrosive action. The fluid diphenoxybiphenyl mixed compositions are particularly useful as inexpensive high-temperature heat-transfer fluids. Such compositions are also useful as high-vacuum diffusion pump oils; lubricants and heat-transfer fluids in jet engines, including stationary jet power units, other type engines, and missiles; heat-transfer and dielectric fluids for electronic apparatus and other electrical equipment, such as high-voltage transformers, etc.; hydraulic fluids for supersonic aircraft and missiles; coolant-moderators for nuclear reactors; etc.

Additionally, especially when the functional fluid compositions are not exposed to extreme conditions of high-temperature and radiation, the various diphenoxybiphenyls and compositions thereof with poly(phenylene-ether) compounds can contain hydrocarbyl substituents thereon such as unsubstituted alkyl, cycloalkyl, aralkyl, aryl and alkaryl groups, but the preferred members of such hydrocarbyl substituents are those wherein the carbon atom bonding said substituent to the benzenoid ring is free from hydrogen atoms, e.g. the tertiary-butyl group and α-cumyl group hereinabove set out. Preferably such unsubstituted hydrocarbyl substituent groups should not contain more than 12 carbon atoms in each group and more preferably still should not contain more than 9 carbon atoms in each group and the total carbon atoms in the sum of the hydrocarbyl group substituents on any compound should preferably not exceed 25 and more preferably still should not exceed 18. Additionally, the hydrocarbyl groups substituted on the terminal benzenoid rings of the diphenoxybiphenyls, or the poly(phenylene-ether) compounds, are in the meta-position with respect to the linkage of such benzenoid ring moiety of the compound and any substituents on the aromatic ring in the alkaryl and aralkyl groups preferably are also in the meta-position with respect to the linkage joining such group to the benzenoid ring of the aforesaid compounds. Illustrative examples of such suitable unsubstituted hydrocarbyl groups are methyl, ethyl, isopropyl, tertiary-butyl, isopropyl, tertiary-amyl, neopentyl, 2-ethylhexyl, cyclopropyl, cyclohexyl, 1-methylcyclohexyl, bicyclohexylyl, β-decahydronaphthyl, benzyl, phenethyl, alpha-mesityl, alpha-cumyl, benzohydryl, phenyl, tolyl, xylyl, and the like.

The individual fluid diphenoxybiphenyls can be prepared by the condensation reaction of the corresponding dihalogenated biphenyl composition, such as 2,3'-, 3,3'-, 3,4'-, or 3,4-dichlorobiphenyls, with at least 2 mole equivalents of phenol and potassium hydroxide, i.e. at least 2 mole equivalents of an alkali metal phenate, over a temperature range from about 160° to about 280° C., but preferably is effected at from about 175° to about 230° C., and more preferably still is effected at from about 180° to about 210° C. for a period of time from about 1 to about 16 hours or longer. Said condensation reactions are carried out in the presence of a copper catalyst which can be powdered metallic copper, copper hydroxides, a copper salt such as cuprous chloride, cupric chloride, etc. or mixtures thereof. Whereas the exact quantity of the copper catalyst is not critical, amounts of the order of about 1 to about 6 mole percent of copper, based on the total mole equivalence of the halogen groups of the dihalogenated biphenyl, have been found to be satisfactory. However, it will be understood that smaller and larger amounts of catalysts can be employed as desired.

After the dihalogenated biphenyl has been reacted with the potassium phenate at the stated temperatures for from 1 to several hours, the reaction mixture is cooled and poured into a dilute aqueous caustic solution and extracted with a number of portions of inert solvent, such as benzene, toluene, xylene, carbon tetrachloride, etc., whereby the aqueous phase removes the potassium halide salt from the system. The combined organic phase is then preferably washed with several portions of dilute potassium hydroxide solutions followed by several washings with water alone, and then the organic phase is dried over a desiccant such as anhydrous magnesium sulfate, filtered, and the organic solvent removed by distillation, whereby the diphenoxybiphenyl compound is retained in the distillation vessel. The reaction product can then be distilled through a Vigreux column to obtain a fluid diphenoxybiphenyl compound, per se.

It also will be understood that the diphenoxybiphenyl compositions of the instant invention can be treated with active charcoal, Attapulgus earth, and/or alumina, preferably by filtering the hot reaction mixture, or a solution thereof, through a column of such material, whereby various color bodies are removed or substantially reduced. It will also be understood that such treatment can also be carried out by mixing any of the aforesaid materials with the diphenoxybiphenyl compositions, preferably at a temperature of from about 50 to about 100° C. and maintaining the charcoal, Attapulgus earth, and/or alumina in a suspended state by mild agitation and subsequently filtering the reaction mixture while still warm. The diphenoxybiphenyl compositions also can be taken up in an organic solvent such as benzene, and the organic solution treated with the aforesaid materials, filtered, and the organic solvent removed by distillation under reduced pressure.

The use of individual isomers of the dihalogenated biphenyl starting materials can become somewhat expensive and in general the final compositions preferably are mixtures rather than individual compounds per se. Accordingly, one can use chlorinated biphenyl compositions containing about 32 percent chlorine, corresponding to an average composition containing 2 atoms of chlorine per molecule of biphenyl, i.e. this composition is a mixture of dichlorobiphenyls. Such mixtures of dichlorobiphenyls provide a cheap reactant and an excellent starting material for the preparation of mixed fluid diphenoxybiphenyl compositions. As known from the prior art, one can prepare such dichlorobiphenyl mixed compositions by the chlorination of biphenyl in the presence of an iron catalyst, such as a ferric chloride catalyst, at reaction temperatures preferably between about 40° C. and about 150° C. and more preferably still between about 100° C. and about 140° C. until the chlorinated biphenyl product contains up to about 32 percent chlorine.

The mixed dichlorobiphenyls preferably are then isomerized in the presence of anhydrous aluminum chloride and anhydrous hydrogen chloride at temperatures from about 50° to about 250° C. and preferably from about 100° C. to about 210° C., and more preferably still from about 150° to about 200° C. for a time of from about 15 minutes to about 10 hours or more and preferably from about 1 hour to about 5 hours. The amount of anhydrous aluminum chloride isomerization catalyst employed in the isomerization reaction can vary from about 0.1 to about 10 or more, and preferably from about 0.5 to about 2 weight percent, based on the halobiphenyl composition. The amount of anhydrous hydrogen chloride which can be employed with the anhydrous aluminum chloride can vary from an amount sufficient to about saturate the reaction mixture at the reaction temperature in a closed system, or the hydrogen chloride can be passed through the reaction mixture constantly during the course of the isomerization reaction. It will also be understood that the reaction mixture can be treated with hydrogen chloride at room temperature prior to heating or added after heating said reaction mixture to a higher temperature.

Additionally, it will be understood that other isomerization catalysts than aluminum chloride can be employed in the present invention. Such additional catalysts are aluminum bromide and gallium trichloride. Furthermore, mixtures of the above-listed isomerization catalysts can be employed. The amount of the isomerization catalyst employed can vary as set forth hereinabove for aluminum chloride per se.

It will also be understood that halogen substituents other than chlorine can be employed in the dihalobiphenyl compositions, i.e. the halogen substituent to the biphenyl compound can be various members of the group of halogen atoms having an atomic number up to 53, for example chlorine, bromine and iodine. The dichlorobiphenyl compounds and mixtures thereof are the preferred reactants in the instant invention and will be employed hereinafter to more fully illustrate the process of the instant invention.

Sufficient dry potassium phenate to react with the halogen atoms of the dihalobiphenyl isomerization mixture is added to a reaction vessel together with an effective amount of the copper catalyst, e.g. cupric chloride, and the temperature raised to from about 225° to 245° C. The crude isomerized dihalobiphenyl composition is then added to the dry reaction mixture at such a rate as to maintain the temperature below about 250° C. after all of the dihalobiphenyl composition has been added to the reaction vessel. The reaction is continued at reflux temperatures of from about 200° to 240° C. for several hours, e.g., or from about 2 to about 10 hours or longer.

The diphenoxybiphenyl mixed composition can then be treated in one of several ways. The reaction mixture can be cooled, taken up in an inert organic solvent and washed with water to remove any residual potassium phenate and the potassium halide salt formed during the reaction. The organic phase is then separated from the aqueous phase and dried. Thereafter the inert solvent employed, for example toluene, is removed by distillation. It has been found that even the presence of about 2 percent of the 4,4'-isomer will cause a mixed composition of the diphenoxybiphenyls to sludge at room temperatures. It was also found that this deficiency could be readily overcome by the substantial removal of the 4,4'-isomer by treatment of the diphenoxybiphenyl composition with an alkane solvent, e.g. hexane, heptane, nonane, and commercial mixtures of alkanes. The alkane solvent and reaction mixture are warmed together preferably at about 40° to 60° C., agitated, and then cooled, whereby the 4,4'-isomer is precipitated therefrom and removed by filtration. The solvent is then stripped from the reaction mixture which may be used as such as a functional fluid or may be further fractionated to provide any particularly desired cut. The recovered 4,4'-dichlorobiphenyl fraction can be separately isomerized to provide a mixture containing the major components 3,3'-diphenoxybiphenyl (about 41%) and 3,4'-diphenoxybiphenyl (about 45%).

Alternatively, the diphenoxybiphenyl reaction mixture can be cooled and acidified to an acid pH with anhydrous hydrogen chloride whereby any remaining potassium phenoxide is converted to phenol and potassium chloride. The reaction mixture can then be heated to about 200° C. under reduced pressure and the phenol and other low boilers are readily removed therefrom and can be recycled in the subsequent preparation of the potassium phenate for the next batch. The remaining fraction of the reaction mixture is then treated with an alkane solvent as previously indicated and the slurry cooled to room temperature, filtered, whereby the insoluble potassium halide, e.g. potassium chloride, and the solid 4,4'-diphenoxybiphenyl isomer are removed from the reaction mixture. The filtercake can be extracted with hot toluene to recover the 4,4'-diphenoxybiphenyl compound for further treatment and recycling as indicated hereinabove.

The following examples are illustrative of the instant invention.

Example 1

A one-liter, four-necked flask was fitted with a stirring means, thermometer, addition funnel, and Dean-Stark trap and charged with 250 g. phenol (2.66 moles), 56 g. potassium hydroxide (1 mole), and 50 ml. of toluene. The substantial excess of phenol employed in this example was to prevent the potassium phenate from "caking-out" at temperatures around 125° C. The water liberated during the formation of potassium phenate was distilled off at a pot temperature of 125° to 135° C. After removal of the water, the reaction mixture was heated to 170° C. to remove the toluene. Thereafter, 5 g. of cupric chloride catalyst (0.04 mole) was introduced into the reaction vessel followed by the dropwise addition of 29 g. of 3,3'-dichlorobiphenyl (0.13 mole) over a period of from 20 to 30 minutes. After the final addition of the 3,3'-dichlorobiphenyl, the reaction mixture was refluxed for 12 hours at 195° to 200° C. with agitation. The reaction mixture was allowed to cool to about 75° C. and taken up with benzene, washed with an aqueous potassium hydroxide solution, the organic and aqueous phases separated, and filtered. The organic phase was further washed with potassium hydroxide solution followed by water, the aqueous phases being removed therefrom, and the organic phase dried over anhydrous magnesium sulfate. The benzene was then distilled from the reaction mixture under reduced pressure and the residue fractionated through an 18-inch Vigreux column. Only trace amounts of materials were obtained over the range of 95° to 190° C. at 0.35 mm. of mercury and the 3,3'-diphenoxybiphenyl by-product was recovered in 87 percent yield over the range of 190° to 214° C. at 0.35 mm. of mercury. The product fraction was redistilled and the fraction having a boiling point range of 211° to 214° C. at 0.35 mm. of mercury was recovered. The product was identified as 3,3'-diphenoxybiphenyl.

Calculated for $C_{24}H_{18}O_2$: C, 85.18; H, 5.36. Found: C, 84.97, 84.99; H, 5.38, 5.29.

The 3,3'-diphenoxybiphenyl compound was found to have a refractive index at 25° C. of 1.6428, a boiling point of about 854° F. and a thermal decomposition point of about 838° F.

Example 2

A glass reaction vessel was placed in an ice bath and 252 ml. concentrated hydrochloric acid together with 252 ml. of water were introduced thereto and chilled, after which 185 g. of 3-aminodiphenyl ether (1 mole) was added thereto. A solution of 64.2 g. of sodium nitrite (0.93 mole) dissolved in 225 ml. of water was added dropwise thereto controlling the temperature below 10° C. so that the diazonium compound formed would not be decomposed and to preclude the loss of nitrous acid. After a positive starch-iodide test to show a slight excess of nitrous acid present, a solution of 166 g. potassium iodide (1 mole) dissolved in 175 ml. of water was added dropwise to the reaction mixture keeping the temperature below 10° C. During the addition of the potassium iodide solution there was a continuous evolution of nitrogen. After completing the addition of the potassium iodide solution, the reaction mixture was gradually warmed to about 50° C. to evolve all the nitrogen and insure complete reaction. The reaction mixture was then taken up in hexane, and the organic phase washed with a solution of potassium hydroxide, followed by a solution of dilute hydrochloric acid, and the organic phase dried over anhydrous magnesium sulfate. The hexane was then removed from the reaction mixture under reduced pressure and the reaction mixture distilled under vacuum. The crude product boiling over the range of 110° to 120 at 0.1 mm. of mercury was recovered and redistilled over a boiling range of 141° to 146° C. at 0.9 to 1.0 mm. of mercury. The 3-iododiphenyl ether was recovered in the amount of 155 g.

The 3-iododiphenyl ether of the foregoing paragraph was combined with the product from a similar reaction and 250 g. thereof (0.84 mole) together with 200 g. o-chloroiodobenzene (0.84 mole) and 450 g. copper-bronze (7.1 moles) introduced into the reaction vessel gradually in amounts of about 50 g. at about 15-minute intervals, i.e. was added over a period of about 2 hours and the reactants were refluxed for 4 hours at about 210° C. The reaction mixture was then taken up in benzene, the copper-bronze filtered therefrom, the filtrate dried over anhydrous magnesium sulfate, the benzene removed under vacuum, and the residual reaction mixture fractionally distilled under reduced pressure. The crude product having a boiling range of 160° to 200° C. at 1.0 mm. of mercury was recovered and redistilled through a Todd column to obtain the 2'-chloro-3-phenoxybiphenyl having a boiling range of 180° to 186° C. at 0.7 mm. of mercury.

Potassium phenate was formed in the same manner and with the same quantities of reactants as set out in Example 1. After the removal of the water, the reaction mixture was heated to 180° C. to evacuate the toluene. Then 5 g. of cupric chloride was added to the reaction vessel followed by the addition of 43.3 g. of 2'-chloro-3-phenoxybiphenyl (0.16 mole) over a time interval of about 15 minutes while maintaining the reaction mixture at about 180° C. Thereafter, the reaction mixture was allowed to reflux for about 16 hours at about 190° C. while agitating the mixture. The reaction mixture was partially cooled but while still warm was taken up in benzene and the organic phase washed with an aqueous potassium hydroxide solution, filtered, and the aqueous phase separated therefrom. The organic phase was further washed with an aqueous solution of sodium hydroxide and dried over anhydrous magnesium sulfate. The benzene was removed from the reaction mixture under reduced pressure and the reaction mixture fractionally distilled. The crude product was observed to have a boiling range of 179° to 199° C. at 0.25 mm. of mercury. The aforesaid crude fraction was redistilled through a Todd column and the 2,3'-diphenoxybiphenyl was observed to have a boiling range of 220° to 222° C. at 0.65 mm. of mercury.

Calculated for $C_{24}H_{18}O_2$: C, 85.18; H, 5.36. Found: C, 85.20, 85.22; H, 5.36, 5.35.

The 2,3'-diphenoxybiphenyl compound was observed to have a refractive index of 1.6385 at 25° C., a boiling point of about 824° F., and a thermal decomposition point of about 822° F.

Example 3

The reactant 4-iododiphenyl ether was prepared in similar manner to the preparation of 3-iododiphenyl ether set out in Example 2. A 3-liter glass reaction vessel was placed in an ice-bath and 165 ml. concentrated hydrochloric acid together with 165 ml. of water were introduced thereto and chilled, after which 120 g. of 4-aminodiphenyl ether (0.648 mole) was added thereto. A solution of 48 g. of sodium nitrite (0.58 mole) dissolved in 225 ml. of water was added dropwise to the reaction vessel controlling the temperature below about 10° C. A solution of 108 g. of potassium iodide (0.65 mole) dissolved in 120 ml. of water was prepared and after a positive starch-iodide test the solution of potassium iodide was introduced dropwise, at a temperature below 10° C., into the reaction vessel. When about one-half of the potassium iodide solution had been added the reaction mixture became somewhat difficult to handle and hexane was added thereto to help mix the reactants and partially solubilize the 4-iododiphenyl ether. Then the balance of the potassium iodide solution was introduced and the reaction mixture allowed to stir overnight at room temperature. The reaction mixture was then gradually warmed to about 50° C. to evolve all the nitrogen and assure complete reaction. Thereafter additional hexane was added to the reaction mixture. The hexane solution was then washed with 3 N potassium hydroxide solution followed by 3 N hydrochloric acid, dried over anhydrous magnesium sulfate, the hexane removed under reduced pressure, and the remaining reaction mixture distilled under vacuum. The crude product boiling over the range of 140° to 148° C. at 1.5 mm. of mercury was recovered and redistilled and the cut having a boiling range of 116° to 120° C. at 0.35 mm. of mercury recovered, providing 103 g. of 4-iododiphenyl ether.

The 4-iododiphenyl ether of the foregoing paragraph was combined with a product from a similar reaction and 280 g. thereof (0.94 mole) together with 238 g. of m-chloroiodobenzene (1 mole) and 500 g. of copper-bronze (7.9 moles) introduced into the reaction vessel in similar manner to Example 2. The reactants were refluxed for 4 hours at about 210° C., allowed to cool and the warm reaction mixture taken up in excess benzene, filtered through Hy Flo Super Cel, the filtrate dried over anhydrous magnesium sulfate, and the benzene removed under reduced pressure. During the concentration of the benzene extracts, 40 g. of crude 4,4'-diphenoxybiphenyl was collected by filtering the concentrated reaction mixture. The residual reaction mixture was fractionally distilled under reduced pressure and 97 g. of crude 3-chloro-4'-phenoxybiphenyl recovered over a boiling range of 135° to 180° C. at 0.15 mm. of mercury and redistilled through a Todd column to obtain the 3-chloro-4'-phenoxybiphenyl product over a boiling range of 185° to 199° C. at 0.5 mm. of mercury.

Thereafter the 3-chloro-4'-phenoxybiphenyl intermediate was added dropwise over a period of 15 minutes to a mixture of potassium phenate together with 5 g. of cupric chloride catalyst at 180° C. in similar manner to that of Example 1. Thereafter the reaction mixture was heated at 190° C. with stirring for 16 hours, cooled, the warm reaction mixture taken up with benzene and washed with a potassium hydroxide solution, and after filtering, the organic phase was separated and washed several times with a dilute solution of sodium hydroxide followed by water and the organic phase dried over anhydrous magnesium sulfate. The benzene was removed from the reaction mixture under vacuum and the residue fractionally distilled. The crude 3,4'-diphenoxybiphenyl was observed to have a boiling point range of from 195° to 230° C. at 0.35 mm. of mercury. The aforesaid crude product was further fractionally distilled and the principal cut was found to have a boiling point range of 222° to 224° C. at 0.25 mm. of mercury. The oil product was identified as 3,4'-diphenoxybiphenyl and was found to have a refractive index at 25° C. of 1.6480, a boiling point of 874° F., and a thermal decomposition point of 838° F.

Example 4

A mixture of 280 ml. concentrated hydrochloric acid in 280 ml. distilled water was introduced into a reaction flask and the mixture cooled to ice-bath temperature. Then 162 g. of 3,4-dichloroaniline (1 mole) was introduced into the reaction flask. Then a solution of 69 g. of sodium nitrite dissolved in 250 ml. water was added slowly thereto during which time the temperature of the mixture was held below about 5° C. After the addition of the sodium nitrite solution the mixture was stirred for one-half hour, filtered through glass wool and the chilled diazonium salt solution added to 1 liter of previously chilled benzene. Then a solution of 325 g. of sodium acetate trihydrate dissolved in 800 ml. of water was chilled and introduced into the reaction flask. Thereafter the ice-bath was removed and the mixture stirred at room temperature. Thereafter the temperature of the mixture was gradually raised to about 60° to 70° C. and held at such temperature for about 2 hours to insure complete reaction. The aqueous phase was then separated therefrom and the organic phase washed several times with water, dried over anhydrous magnesium sulfate, and filtered. The filtrate was fractionally distilled, the excess benzene removed, and 125 g. of crude product obtained, which product had a boiling range of 127° to 130° C. at 0.4 to 0.5 mm. of mercury. The crude product was redistilled and 111.7 g. of 3,4-dichlorobiphenyl having a boiling range of 111° to 114° C. at 0.3 mm. of mercury recovered.

Potassium phenate was prepared in the same manner and employing the same quantities of reactants as set out in Example 1. After removal of the water, the reaction mixture was heated to 180° C. to remove the toluene. The reaction mixture was then heated to 190° C. and 5 g. of cupric chloride catalyst added thereto. Then 33 g. of 3,4-dichlorobiphenyl (0.147 mole) was introduced slowly to the reaction mixture over a period of one-half hour. Thereafter the reaction mixture was heated for 12 hours at 195° C., cooled, and the warm reaction mixture taken up with benzene, washed with an aqueous potassium hydroxide solution, filtered, and the organic and aqueous phases separated. The organic phase was washed with additional potassium hydroxide solution and dried over anhydrous magnesium sulfate, filtered, and the benzene removed therefrom under reduced pressure. The reaction mixture was then distilled and the crude product having a boiling range of 192° to 210° C. at 0.4 mm. of mercury recovered. The crude product was redistilled and the 3,4-diphenoxybiphenyl having a boiling range of 205° to 210° C. at 0.35 mm. of mercury recovered. The 3,4-diphenoxybiphenyl product was observed to have a refractive index of 1.6478 at 25° C., a boiling point of 832° F., and a thermal decomposition point of 809° F.

Example 5

A charge of 163 g. of a mixed dichlorobiphenyl composition prepared by the chlorination of biphenyl in the presence of an iron catalyst to provide a composition containing about 32 percent chlorine, was introduced into the reaction vessel and the material warmed to 150° C. and saturated with dry hydrogen chloride. Then 8.6 g. of anhydrous aluminum trichloride (5 percent by weight) was added thereto over a 10-minute period during which time the temperature of the reaction mixture rose to 160° C. Dry hydrogen chloride was swept through the hot reaction mixture for an additional time of about 0.5 hour, and then such flow of hydrogen chloride was terminated and the reaction mixture heated for an additional period of about 1.5 hours at a temperature between 160° and 170° C. and then allowed to cool. The reaction mixture was taken up in carbon tetrachloride, filtered through a diatomaceous earth coated filter and the filter cake pressed dry after additional washing with carbon tetrachloride. The filtrate was washed with a saturated aqueous solution of sodium bicarbonate, the organic phase separated therefrom, dried over anhydrous magnesium sulfate, filtered, and the carbon tetrachloride removed therefrom under vacuum. The residual reaction mixture was then fractionated and the fraction having the boiling range of 80° to 118° C. at 0.07 mm. of mercury, consisting mainly of 3,3'-, 3,4'-, and 4,4'-dichlorobiphenyls. This fraction weighed 142 g. (87 percent recovery).

Potassium phenate was prepared in the same manner and with the same quantity of reactants as set out in Example 1. After all the water had been distilled off, the reaction mixture was heated to 170° C. to remove the final traces of toluene. Cupric chloride in the amount of 5 g. as catalyst was added thereto and 40 g. of the mixed dichlorobiphenyl (0.18 mole) prepared as shown in the aforegoing paragraph was added to the hot reaction mixture over a 30-minute period. The reaction mixture was then held at about 190° C. with stirring for a period of 10 hours, cooled, and while still warm taken up in excess benzene and an aqueous potassium hydroxide solution, filtered through Hy Flo Super Cel, the organic phase separated therefrom, washed with dilute aqueous potassium hydroxide, the organic phase dried over anhydrous magnesium sulfate, and the benzene removed under reduced pressure. The crude product boiling over the range 175° to 220° C. at 0.10 mm. of mercury was refractionated, and the product boiling over the range of 180° to 218° C. at 0.10 mm. of mercury recovered. This product was a fluid slurry which on standing set up to a non-fluid composition due to the precipitation of the 4,4'-dichlorobiphenyl product.

In similar manner to the procedure set out in the first paragraph of this example 170 g. of the aforesaid dichlorobiphenyl was introduced into a reaction vessel, warmed to 150° C., and saturated with dry hydrogen chloride. Then 3.4 g. of anhydrous aluminum chloride (2 weight percent) was added thereto over a 5-minute period and dry hydrogen chloride bubbled through the mixture for an additional 30 minutes. The temperature was observed to be about 160° C. The reaction mixture was heated for an additional 1.5 hours and the final temperature was 170° C. The reaction mixture was treated in a similar manner to that set out at the first paragraph of this example and the fraction distilling over the boiling range of 90° to 115° C. at 0.07 mm. of mercury recovered (155.7 g., i.e., 91.5% recovery). This isomerized mixture of dichlorobiphenyls, mainly consisting of the 3,3'-, 3,4'-, and 4,4'-isomers can be converted to a diphenoxybiphenyl mixed composition in similar manner to that set out in the second paragraph of this example.

Example 6

A chlorinated biphenyl product containing about 32 percent chlorine, i.e., the average composition of the mixture is that of the dichlorobiphenyls, prepared by the chlorination of biphenyl in the presence of an iron catalyst, as briefly described hereinabove, was fractionally distilled and the cut having a boiling point of from about 90° to 120° C. at 0.3 mm. of mercury recovered. This fractionation reduces the minor amounts of monochlorobiphenyls and trichlorobiphenyls which may be present in the product.

Potassium phenate was prepared in a similar apparatus to that described in Example 1 by the reaction of 400 g. of phenol (4.15 moles), 79 g. of potassium hydroxide (1.4 moles) and 50 ml. of toluene. After all of the water had been distilled off, the reaction mixture was heated to about 170° C., 5 g. of cupric chloride catalyst was added, and then 90 g. of the dichlorobiphenyl (0.4 mole) cut of the preceding paragraph was added thereto dropwise over a period of about 30 minutes. The reaction mixture was refluxed for 5 hours at 190° C., cooled, and the warm reaction mixture treated with 3 N potassium hydroxide and benzene, filtered, the organic phase separated and washed with additional potassium hydroxide, the organic phase dried over anhydrous magnesium sulfate, and the benzene removed therefrom under reduced pressure. The reaction mixture was fractionally distilled and the cut over the boiling range of 180° to 235° C. at 0.15 mm. of mercury recovered, and redistilled to obtain 71.9 g. of product having a boiling range of 180° to 230° C. at 0.15 mm. of mercury and the mixture of diphenoxybiphenyls was found to have a thermal decomposition point of 807° F.

A 27-g. sample of the foregoing mixture was transferred to a small flask, warmed, and treated with an equal volume of hexane with good agitation. A white crystalline solid was precipitated from the mixture, collected by filtering, dried, and identified as 4,4'-di-phenoxybiphenyl. The hexane was removed from the filtrate under reduced pressure and the viscous liquid diphenoxy-biphenyl mixture, substantially free from 4,4'-diphenoxybiphenyl, was observed to remain free from cloudiness or crystal formation.

Example 7

A 50-g. sample of 4,4'-dichlorobiphenyl (0.224 mole) was melted in a reaction vessel and heated to 180° C., 4 g. of anhydrous aluminum chloride added thereto, and (dry) hydrogen chloride gas bubbled through the mixture. The mixture was heated for 2 hours at 180° C. to isomerize the 4,4'-dichlorobiphenyl into other dichlorobiphenyl isomers, essentially 3,3'- and 3,4'-dichlorobiphenyls. The dark mixture was allowed to cool, taken up in carbon tetrachloride, filtered through Celite, washed with a saturated aqueous solution of sodium bicarbonate, dried over anhydrous magnesium sulfate, the carbon tetrachloride removed therefrom under vacuum, and the residue fractionally distilled. A small amount of forerun boiling up to 100° C. at 0.35 mm. of mercury was discarded and 46.5 g. of the product boiling over the range of 100° to 180° C. at 0.35 mm. of mercury was recovered. The isomerized product was a clear liquid, which even on seeding with 4,4'-dichlorobiphenyl failed to crystallize any significant amount of the aforesaid isomer at room temperature.

The aforesaid 46.5-g. sample of mixed dichlorobiphenyls (0.208 mole), comprising mainly 3,3'-, 3,4'-, and 4,4'-dichlorobiphenyls together with small amounts of the 2,3- and other isomers, was added over a 30-minute period at 190° to 200° C. to a mixture of potassium phenate, prepared in the same manner and with the same quantities of reactants as set out in Example 1, together with 5 g. of cupric chloride catalyst. The reaction mixture was refluxed vigorously and the reaction mixture heated for 12 hours at 195° to 200° C. The reaction mixture was then cooled and while still warm treated with benzene and 3 N potassium hydroxide, filtered through Hy Flo Super Cel, the organic phase separated and washed with potassium hydroxide, dried over anhydrous magnesium sulfate, and stripped of benzene under reduced pressure. The reaction mixture was then fractionated and 52 g. of product having a boiling range of 190° to 218° C. at 0.3 mm. of mercury recovered. The crude reaction mixture fraction was redistilled and the cut boiling at 205° to 214° C. at 0.25 mm. of mercury recovered. This mixture of diphenoxybiphenyls was found to have a thermal decomposition point of 831° F.

Calculated for $C_{24}H_{18}O_2$: C, 85.18; H, 5.36. Found: C, 85.12, 85.17; H, 5.16, 5.33.

Without removal of the 4,4'-diphenoxybiphenyl isomer from the mixed composition, said composition was observed to be a solid sludge. The aforesaid diphenoxybiphenyl mixed composition was then warmed on a steambath to about 50° C. and with stirring treated with an equal volume of hexane. A mixed composition was initially dissolved in the hexane and then a white solid crystalline precipitate of the 4,4'-diphenoxybiphenyl was observed, the composition cooled to room temperature and the said 4,4'-isomer removed therefrom by filtration. The hexane was removed from the filtrate under vacuum and the residue redistilled and the fraction boiling over the range 205° to 214° C. at 0.25 mm. of mercury recovered. The aforesaid mixed diphenoxybiphenyl composition, substantially free of the 4,4'-diphenoxybiphenyl isomer, was observed to remain a clear liquid on standing at room temperature, i.e. no precipitate or sludge formation was observed.

Example 8

A 25-g. sample of 4,4'-diphenoxybiphenyl (.074 mole) was heated to 210° C. to assure complete melting of the compound. The said compound was saturated with dry hydrogen chloride and then 4 g. of anhydrous aluminum chloride catalyst (13.8 percent by weight) was added thereto over a 10-minute period and the reaction temperature was observed to rise to about 240° C. for about 0.5 hour. Dry hydrogen chloride gas was continuously introduced into the reaction mixture over the total reaction time of 1.5 hours to maintain said reaction mixture saturated with hydrogen chloride. The final reaction temperature at the end of the 1.5-hour reaction time was observed to be 210° C. The reaction mixture was cooled to 100° C., taken up with carbon tetrachloride, and filtered through Hy Flo Super Cel. The organic filtrate was then washed with a saturated aqueous solution of sodium bicarbonate, filtered through Hy Flo Super Cel, the organic layer separated and dried over anhydrous magnesium sulfate, filtered, and the carbon tetrachloride removed therefrom under reduced pressure. The reaction mixture was then fractionally distilled and the crude isomerized diphenoxybiphenyl composition having a boiling range of 165° to 220° C., at 0.2 mm. of mercury recovered. This crude product was observed to sludge up or solidfy at room temperature. The aforesaid crude product was warmed in an oven until clear and homogenous, then treated with an equal volume or hexane with stirring and the 4,4'-diphenoxybiphenyl was observed to precipitate out of the composition within a few minutes. The precipitate was filtered therefrom, the hexane removed from the diphenoxybiphenyl composition under vacuum and the product fractionally distilled, recovering a cut having a boiling range of 180° to 212° C. at 0.2 mm. of mercury. This clear diphenoxybiphenyl composition was observed to have essentially the same physical properties as compositions prepared by the isomerization of dihalobiphenyl compositions, phenoxylated with potassium phenate, as illustrated in the foregoing examples, and then treated with a saturated hydrocarbon, such as hexane, to remove the 4,4'-isomer therefrom.

Accordingly, the liquid, free-flowing diphenoxy-biphenyl compositions of the instant invention can be prepared by the phenoxylation of the dihalobiphenyl compound or mixed compositions thereof with subsequent isomerization and precipitation of the 4,4′-isomer, or the dihalobiphenyl per se, or mixed commercial compositions, can first be isomerized, then phenoxylated and the 4,4′-isomer precipitated therefrom.

Example 9

In the following illustrative example all parts are in part by weight, unless otherwise expressly indicated.

To a reaction vessel equipped with an agitation means 85.3 parts of a chlorinated biphenyl composition containing 32 percent chlorine, i.e. containing an average of 2 chlorine atoms per biphenyl molecule, was warmed to about 75° C. Then 0.9 part of anhydrous aluminum chloride was added thereto and the reaction mixture heated to about 175° to about 180° C. for a time of about 2 hours.

The potassium phenate reactant necessary for the phenoxylation of the isomerized chlorinated biphenyl composition was prepared by the reaction of 47.3 parts of potassium hydroxide with 99.5 parts of phenol in the presence of about 12 parts of toluene and the water was removed by azeotropic distillation during the course of the reaction. The temperature of the potassium phenate reactant composition was progressively increased to avoid the solidification of the product, thus the reaction can be initiated at a temperature of the order of from about 100° to 140° C. and was completed at a temperature of the order of about 260° C. The reactant mass was then allowed to cool to about 240° to about 245° C. and 1.71 parts of cupric chloride added thereto, followed by the addition of the isomerized dichlorobiphenyl composition, which was added at such a rate as to maintain the reaction temperature below about 250° C. After the isomerized dichlorobiphenyl composition had been added, the reaction mixture was held at a reflux temperature of the order of about 200° to 240° C. for about 6 hours.

Then the reaction mixture was permitted to cool to about 170° C. and acidified with dry hydrogen chloride to a pH of from about 2 to about 3, whereby any excess potassium hydroxide was converted to potassium chloride and unreacted potassium phenate was converted to phenol. The acidified reaction mixture was then heated to about 200° C. under reduced pressure of about 10 to 15 mm. of mercury and held under these conditions for about 45 minutes in order to distill the low-boiler fractions from the reaction mixture, which fraction includes excess phenol which is recovered and recycled.

The reaction mixture was then cooled and 102 parts of Skellysolve E, a hydrocarbon solvent having a boiling range of from about 100° to about 140° C., which hydrocarbon solvent effects the precipitation of the potassium chloride remaining in the reaction mixture and the 4,4′-diphenoxybiphenyl. The mixture was cooled to about 15 to 20° C. and filtered to remove the said potassium chloride and 4,4′-diphenoxybiphenyl, and the filter cake washed with several portions of Skellysolve E. The 4,4′-diphenoxybiphenyl can be separated from the filter cake by any suitable means, e.g. washing with hot toluene at about 85 to 90° C., and recycled to the isomerization stage of the process, or be isomerized separately in similar manner to that set out in Example 8, and the isomerized mixture added to the reaction mixture of a subsequent batch of diphenoxybiphenyl compositions prior to treatment with the hydrocarbon solvent.

The filtrate containing the balance of the reaction mixture together with the hydrocarbon solvent was then washed with 50 parts of water at about 70° C. and the aqueous phase removed therefrom. The hydrocarbon solvent was then removed by fractional distillation and was recycled in the process. It was found that the hydrocarbon solvent was essentially all removed and the reaction mixture was dried by heating said reaction mixture to about 175° to 170° C. at 10 mm. of mercury for about 1 hour. Thereafter the pot temperature was increased and the vacuum reduced to about 0.1 mm. of mercury and the first about 4 percent of product distilled, containing any flushed hydrocarbon solvent or possible residual low boilers, separated and recycled. Distillation was then continued, and the product recovered until about 96 percent of the reaction mixture had been distilled.

The diphenoxybiphenyl composition was found to be rich in the 3,3′- and 3,4′-isomers and had a liquid range of from about 45° F. to 850° F., i.e. a fluid range of 805° F., and excellent thermal stability.

Example 10

A sample of chlorinated biphenyl containing 32 percent chlorine, i.e., about 2 chlorine atoms per biphenyl molecule, was introduced into a reaction vessel and isomerized at about 180° C. for about 2 hours with 10 weight percent of anhydrous aluminum chloride catalyst.

To a reaction vessel similar to that described in Example 1 was added 186 g. of m-phenoxyphenol (1 mole), 42 g. of potassium hydroxide (0.75 mole) and 50 ml. of toluene. After all of the water had been distilled off, the reaction mixture containing the potassium m-phenoxyphenate was heated to 170° C. to remove all traces of toluene. Then 5 g. of cupric chloride was added to the reaction mixture and 24.3 g. of isomerized dichlorobiphenyl (0.109 mole) added thereto over a 0.5 hour period. This reaction mixture was heated at 200° to 210° C. for 16 hours with stirring, cooled, the still warm reaction mixture taken up in excess 3 N potassium hydroxide and benzene, filtered through Hy Flo Super Cel, the aqueous phase removed, the organic phase washed with additional potassium hydroxide solution, the aqueous phase removed, and the organic phase dried over anhydrous magnesium sulfate. The benzene was then removed under reduced pressure and the reaction mixture distilled under vacuum and the x,x′-di(m-phenoxyphenoxy)biphenyl composition boiling over the range of 260° to 305° C. at 0.1 mm. of mercury recovered. The product was redistilled and the fraction boiling from 295° to 300° C. to 0.1 to 0.2 mm. of mercury recovered. The recovered composition was warmed and filtered through a filter bed consisting of Attapulgus clay and alumina.

Calculated for $C_{36}H_{26}O_4$: C, 82.73; H, 5.01. Found: C, 82.54, 82.74; H, 5.13, 5.20.

The x,x′-di(m-phenoxyphenoxy)biphenyl composition consists essentially of the 3,3′- and 3,4′-isomers, and was observed to be a clear, viscous fluid at room temperature. Said composition was found to have a thermal decomposition point of about 837° F. and a boiling point of about 1038° F.

It will be understood that other isomers of di(phenoxyphenoxy)biphenyls are also included within the scope of this invention, such as 3,3′-di(p-phenoxyphenoxy)biphenyl, 3-(p-phenoxyphenoxy)-4′-(m-phenoxyphenoxy) biphenyl, and other isomers, preferably those having at least one meta linkage in the molecule and more preferably still having at least two meta linkages in the molecule. It will also be understood that mixed isomeric compositions of di(phenoxyphenoxy)biphenyls can also include minor amounts of isomers thereof which do not contain the meta linkage.

The viscosities in centistokes at various temperatures ranging from 77° F. to 800° F. for various compositions are given at Table I. It should be noted that the manipulative examples were randomly selected as representative illustrative examples of particular procedures, whereby the viscosity determinations were not made at each listed temperature for all samples. Additionally, extrapolated values for the temperature in degrees F. for a viscosity of 20,000 centistokes are given in said table, which data provides a close approximation for the lower temperature at which the materials are effective fluid compositions.

As demonstrated in certain of the foregoing examples 4,4′-diphenoxybiphenyl in the mixed compositions tends to crystallize out of the mixtures and cause the mixtures to set up into immobile sludges. Whereas the quantity of the 4,4'-isomer was reduced by chilling out from a mixture, such procedure was essentially ineffective in that residual 4,4'-isomer would again effect setting up of the mixture. It was found that the 4,4'-isomer could be selectively precipitated from the reaction mixture by the use of a non-polar solvent. Preferably such solvents are the unsubstituted alkanes and cycloalkanes containing from about 5 to about 10 carbon atoms, such as pentane, hexane, 2-methylhexane, 2,4-dimethylhexane, 2-ethylhexane, heptane, 2,6-dimethylheptane, 4-ethylheptane, octane, 3-methyloctane, 2,7-dimethyloctane, nonane, decane, cyclopentane, cyclohexane, methylcyclohexane, 1,3-dimethylcyclohexane, 1,3,5-trimethylcyclohexane, isopropylhexane, cycloheptane, cyclooctane, and the like and mixtures thereof, including commercial mixtures such as any crude gasoline cut. Preferably such solvents should be selected such that the boiling point thereof ranges from about 50° C. to about 175° C. and more preferably still from about 90° C. to about 150° C.

It was also found that the chlorinated biphenyl composition containing about 32 percent chlorine prepared by the chlorination of biphenyl in the presence of an iron catalyst as set out hereinabove and consisting essentially of 2,2'-, 2,4-, 2,4'-, and 4,4'-dichlorobiphenyls with minor amounts of monochlorobiphenyls and lesser amounts of trichlorobiphenyls could be directly converted into useful diphenoxybiphenyl functional fluid compositions. Such chlorinated biphenyl compositions also can be fractionated to top out the monochlorobiphenyls and retain the trichlorobiphenyls in the distillation pot, whereby the distilled dichlorobiphenyl composition cut has the approximate composition of about 50 percent 2,4'-dichlorbiphenyl, 22 percent 2,2'-dichlorobiphenyl, 9 percent 2,4-dichlorobiphenyl, and 19 percent 4,4'-dichlorobiphenyl. Such fractionated dichlorobiphenyl compositions when converted to mixed diphenoxybiphenyl compositions by diphenoxylation, in similar manner to the preceding examples, surprisingly in view of the melting points of the individual components also provided useful functional fluid compositions which are viscous liquids at room temperature having viscosities of the order of about 600 centistokes at 100° F. However, as noted hereinabove, it is preferred that the mixed dichlorobiphenyl compositions or the mixed diphenoxybiphenyl compositions be isomerized to obtain a mixed composition with the isomer components favoring a less viscous composition of the order of about 200 to 300 centistokes at 100° F.

From the foregoing disclosure it is observed that mixtures of diphenoxybiphenyls having little or no meta linkages in the composition can be employed as functional fluid compositions, but such compositions, particularly those containing substantial amounts of the 2,2'- and 4,4'-isomers, tend to crystallize on standing at room temperature, whereby such compositions are preferably used as heat-transfer fluids, etc., wherein they are used in substantially continuous operations at elevated temperatures of the order of about 100° C. and higher. To provide fluid compositions at room temperature and lower it is preferred that at least about 40 percent of the total linkages of all the diphenoxybiphenyl and poly(phenyleneether) compounds comprising the compositions of this invention to be present in the meta position and that such compositions contain less than about 2 weight percent of 4,4'-diphenoxybiphenyl. More preferably still the compositions of this invention should contain at least 40 weight percent or more of the "fluid diphenoxybiphenyl" compounds in such composition and, as set out hereinabove, such compositions preferably should contain at least 50 weight percent of the "fluid diphenoxybiphenyl" compounds.

TABLE I

| Example | Viscosity in centistokes at temperature in ° F. | | | | | | | | ° F. for 20,000 cs. viscosity |
|---|---|---|---|---|---|---|---|---|---|
| | 77 | 100 | 210 | 400 | 500 | 600 | 700 | 800 | |
| 1 | 859.1 | 196.7 | 8.532 | 1.541 | 0.965 | 0.662 | 0.490 | 0.380 | 37 |
| 2 | 3,001 | 394.1 | 8.808 | 1.397 | 0.863 | 0.596 | 0.444 | 0.342 | 60 |
| 3 | 998.5 | 209.2 | 8.990 | 1.585 | 0.982 | 0.685 | 0.505 | 0.354 | 43 |
| 4 | 10,400 | 894.7 | 11.33 | 1.539 | 0.985 | 0.646 | 0.476 | 0.366 | 62 |
| 5 | | 284.7 | 9.317 | 1.565 | 0.967 | 0.670 | 0.498 | 0.386 | 50 |
| 6 | 6,059 | 605.8 | 10.05 | 1.498 | | | | 0.357 | 67 |
| 7 | | 240.2 | 9.137 | 1.59 | | | | | 43 |
| 8 | | 189.9 | 8.314 | 1.545 | 0.965 | 0.677 | 0.507 | 0.397 | 44 |
| 9 | | 215.0 | | | | | | | |
| 10 | | | 43.36 | 3.600 | 1.983 | 1.274 | 0.904 | 0.678 | |

We claim:
1. 2,3'-diphenoxybiphenyl.
2. 3,3'-diphenoxybiphenyl.
3. 3,4'-diphenoxybiphenyl.
4. 3,4-diphenoxybiphenyl.
5. A process for the preparation of a fluid diphenoxybiphenyl composition which comprises blending a non-fluid mixture of diphenoxybiphenyls containing at least about 2% of 4,4'-diphenoxybiphenyl with a non-polar solvent and separating therefrom a fluid diphenoxybiphenyl compound or mixture.
6. A process of claim 5 wherein the non-polar solvent is selected from the group consisting of an aliphatic solvent, a cycloaliphatic solvent, a petroleum distillate and mixtures thereof.

References Cited

UNITED STATES PATENTS

| 2,095,619 | 10/1937 | Stoesser et al. | 260—612 |
| 3,081,355 | 3/1963 | Johnson | 260—613 |
| 3,083,234 | 3/1963 | Sax | 260—613 |
| 3,221,058 | 11/1965 | Engelsma et al. | 260—613 |

OTHER REFERENCES

Baddley, Jour. Chem. Society (London) (1943) pp. 527–531 QD 1C6.

Blake et al., High-Temperature Hydraulic Fluids Part III, W.A.P.C. Technical Report 54–532, A.S.T.I.A. Document No. AD 118179, April 1957, pp. 32 and 44.

BERNARD HELFIN, *Primary Examiner.*